(12) United States Patent
Matsui et al.

(10) Patent No.: US 10,826,204 B2
(45) Date of Patent: Nov. 3, 2020

(54) CONDUCTIVE MEMBER AND CONDUCTIVE PATH USING A PLURALITY OF CONDUCTIVE MEMBERS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Hajime Matsui, Mie (JP); Yasuo Omori, Mie (JP)

(73) Assignees: AutoNetworks Technologies, Ltd. (JP); Sumitomo Wiring Systems, Ltd. (JP); Sumitomo Electric Industries, Ltd. (JP)

( * ) Notice: Subject to any disclaimer, the term of this patent is extended or adjusted under 35 U.S.C. 154(b) by 0 days.

(21) Appl. No.: 16/474,090

(22) PCT Filed: Dec. 7, 2017

(86) PCT No.: PCT/JP2017/043920
§ 371 (c)(1),
(2) Date: Jun. 27, 2019

(87) PCT Pub. No.: WO2018/123495
PCT Pub. Date: Jul. 5, 2018

(65) Prior Publication Data
US 2020/0127391 A1    Apr. 23, 2020

(30) Foreign Application Priority Data
Dec. 28, 2016  (JP) ................................ 2016-254676

(51) Int. Cl.
*H01R 4/58* (2006.01)
*H01R 4/56* (2006.01)
(Continued)

(52) U.S. Cl.
CPC ................. *H01R 4/58* (2013.01); *H01R 4/56* (2013.01); *H01R 9/03* (2013.01); *B60R 16/0215* (2013.01)

(58) Field of Classification Search
CPC .... H01R 4/58; H01R 4/56; H01R 9/03; B60R 16/0215; H01B 7/00; H01B 7/08
See application file for complete search history.

(56) References Cited

U.S. PATENT DOCUMENTS

2005/0239300 A1* 10/2005 Yasumura ............. H05K 1/117
                                                            439/65
2008/0078572 A1*  4/2008 Watanabe ............ H05K 3/4046
                                                           174/262
(Continued)

FOREIGN PATENT DOCUMENTS

JP       1-86124     6/1989
JP     2014-121227   6/2014

OTHER PUBLICATIONS

International Search Report dated Jan. 23, 2018.

*Primary Examiner* — Truc T Nguyen
(74) *Attorney, Agent, or Firm* — Gerald E. Hespos; Michael J. Porco; Matthew T. Hespos (57) ABSTRACT

A conductive member includes a conductive portion (13) in which conductive plates (12) are arranged at intervals in a plate thickness direction. An insulating portion (14) covers the conductive portion (13) and insulates between the plates (12). Each of the plates (12) has a penetrating connection hole (15) enabling electrical connection of each plate (12) to the outside. The connection holes (15) are disposed at positions displaced in a plate surface direction in the plates (12) and are exposed to the outside via open holes (17, 18) provided in the plates (12) and the insulating portion (14).

8 Claims, 13 Drawing Sheets

(51) Int. Cl.
*H01R 9/03* (2006.01)
*B60R 16/02* (2006.01)

(56) References Cited

U.S. PATENT DOCUMENTS

| | | | | |
|---|---|---|---|---|
| 2011/0281474 | A1* | 11/2011 | Weinmann | H01R 13/6466 439/676 |
| 2012/0034822 | A1* | 2/2012 | Bopp | H05K 1/0228 439/676 |
| 2013/0210289 | A1* | 8/2013 | Schumacher | H01R 24/00 439/676 |
| 2013/0229323 | A1* | 9/2013 | Lee | H01Q 21/0006 343/905 |
| 2013/0330941 | A1* | 12/2013 | Jeon | H01R 12/585 439/65 |
| 2014/0065856 | A1* | 3/2014 | Regnier | H05K 1/0246 439/108 |
| 2014/0349496 | A1* | 11/2014 | Zhu | H05K 1/0219 439/108 |
| 2017/0301964 | A1* | 10/2017 | Murakami | H01M 10/6551 |
| 2020/0086325 | A1* | 3/2020 | Chou | B01L 7/52 |

* cited by examiner

CONDUCTIVE MEMBER AND CONDUCTIVE PATH USING A PLURALITY OF CONDUCTIVE MEMBERS

BACKGROUND

Field of the Invention

The invention relates to a conductive member and a conductive path using a plurality of conductive members.

Related Art

Japanese Unexamined Patent Publication No. 2014-121227 describes a wiring harness formed by bundling a multitude of wires for connecting between a battery and various electrical components of an automotive vehicle. However, even if the wiring harness is installed along a mounting surface, there are some empty spaces around the wiring harness. These empty spaces impede space saving when an enlargement of the wiring harness is expected as described below.

For example, it is considered to install a high-voltage power source in a vehicle and to provide both a low pressure-side power supply circuit and a high pressure-side power supply circuit to reduce power loss by increasing a pressure of the battery. Then, the number of wires of the wiring harness is thought to increase as compared to the case where only the low pressure-side power supply circuit is provided.

Further, carbon is used increasingly as a vehicle body material to save weight, and it becomes difficult to connect to ground (vehicle body) near an electrical component. Thus, it is considered to extend a ground wire of the electrical component to the ground near a battery and the like. Then, the ground wire is included in the wiring harness and the number of wires of the wiring harness is thought to increase.

The invention was completed on the basis of the above situation and aims to provide a conductive member and a conductive path using a plurality of conductive members in a construction that saves space.

SUMMARY

A conductive member of the present invention includes a conductive portion in which conductive plate-like members are arranged at intervals in a plate thickness direction. An insulating portion covers the conductive portion and insulates between the plate-like members. Each of the plate-like members is formed with a penetrating connection hole that enables electrical connection of each plate-like member to the outside. The connection holes are at positions displaced in a plate surface direction in the plate-like members and are exposed to the outside via open holes in the plate-like members and the insulating portion.

The conductive path of the invention uses the conductive members, and connecting members are inserted into the connection holes in the conductive members so that the plate-like members are connected electrically to each other.

The conductive paths formed by the plate-like members reduce the sizes of empty spaces when the conductive paths extend along a mounting surface. Thus, space saving can be realized.

The connection holes and the open holes may be arranged side by side in a direction oblique to a length direction of the plate-like members. According to this configuration, the conductive members can be connected in a linear direction or in orthogonal directions.

The conductive path may include a positioning member capable of positioning the conductive members such that the connection holes communicate in the plate thickness direction. According to this configuration, an operation of connecting the conductive members can be easily performed.

DETAILED DESCRIPTION

One embodiment of the invention is described in detail with reference to FIGS. 1 to 16.

A conductive member 10 and a conductive path using the conductive members 10 in this embodiment are used mainly for in-vehicle wiring of an automotive vehicle.

Figure 1:
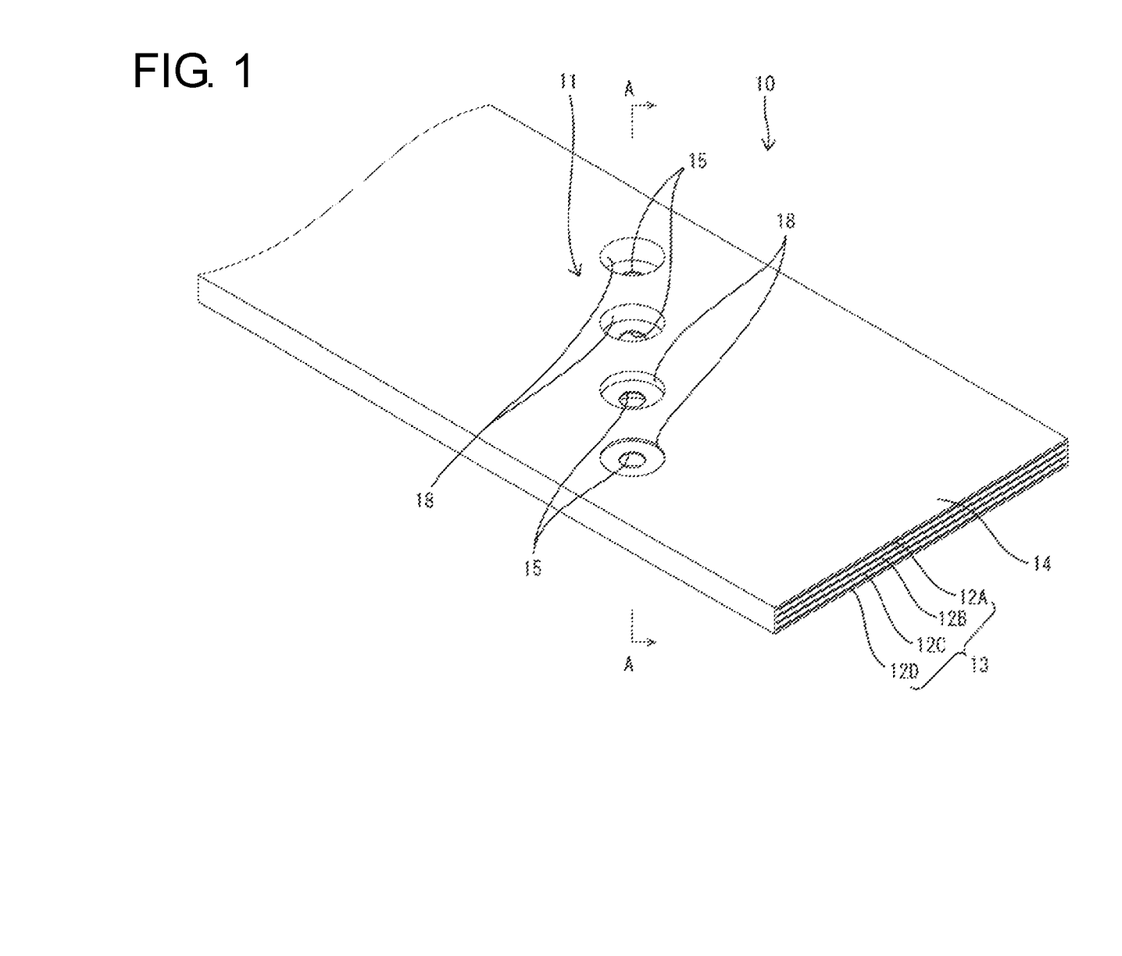
FIG. 1 is a perspective view showing a conductive member in an embodiment.

The conductive member 10 is a strip that is long in one direction. A length of the conductive member 10 is set to extend along a routing path of the vehicle. The conductive member 10 includes a conductive portion 13 in which conductive plate-like members 12 are arranged at intervals in a plate thickness direction and an insulating portion 14 for insulating between the plate-like members 12 by covering the conductive portion 13.

The plate-like members 12 constitute various electrical circuits. In this embodiment, the conductive portion 13 includes four plate-like members 12. Out of these, two plate-like members 12 constitute a high pressure-side power supply circuit for supplying power from a high-voltage power supply (e.g. 48V battery) to high-voltage loads and the other two plate-like members 12 constitute a low pressure-side power supply circuit for supplying power from a low-voltage power supply (e.g. 12 V battery) to low-voltage loads. The insulating portion 14 covers the entire outer surface of the conductive portion 13 to insulate and protect the conductive portion 13.

Each plate-like member 12 is made of metal and all od the plate-like members 12 constituting one conductive member 13 have the same width and length. The plate-like members 12 are laminated at equal intervals in a vertical direction (plate thickness direction). Hereinafter, the plate-like member 12 located on an uppermost side in FIG. 1 is referred to as a first plate-like member 12A, the other plate-like members 12 below the first plate-like member 12A are successively referred to as a second plate-like member 12B and a third plate-like member 12C and the plate-like member 12 located on a lowermost side is referred to as a fourth plate-like member 12D.

The conductive member 10 is provided with a connecting portion 11 enabling electrical connection of the conductive portion 13 to outside (other conductive member 10, ground or the like). The connecting portion 11 is provided at an end part or intermediate part in a length direction of the conductive member 10. Branched portions can be formed by providing one conductive member 10 with a plurality of the connecting portions 11. A connection hole 15 enabling potential connection of each plate-like member 12 to outside is exposed in the connecting portion 11.

Figure 2:
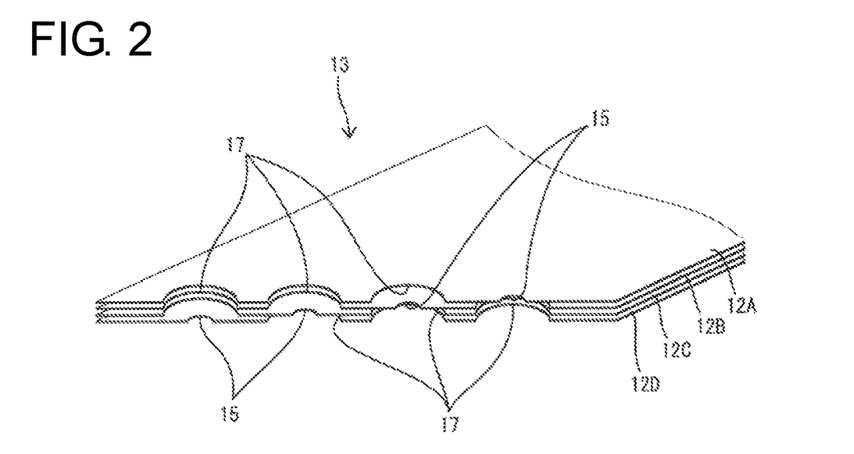
FIG. 2 is a perspective view in section along A-A of FIG. 1 of a conductive portion of the conductive member.

As shown in FIG. 2, each plate-like member 12 is formed with through holes 16 penetrating in the plate thickness direction and corresponding in number to the number of the plate-like members 12 included in one conductive portion 13 (four in this embodiment). One of the through holes 16 provided in one plate-like member 12 constitutes the connection hole 15 and all of the other connection holes 16 constitute first open holes 17 allowing the connection holes 15 of the other plate-like members 12 to be exposed to outside. All of the through holes 16 are circular. The through holes 16 (connection hole 15 and first open holes 17) are arranged at equal intervals in a direction oblique to the length direction of the plate-like member 12. The through holes 16 vertically coaxially communicate in the connecting portion 11 of the conductive member 10.

The connection holes 15 are disposed at positions displaced in a plate surface direction in all of the plate-like members 12 constituting the conductive portion 13. In this embodiment, the connection holes 15 are at positions arranged side by side in a direction oblique to the length direction of the conductive portion 13 and are displaced successively from one end toward the other end in a width direction of each plate-like member 12 from the connection hole 15 of the first plate-like member 12A toward the connection hole 15 of the fourth plate-like member 12D.

As shown in FIG. 1, the insulating portion 14 is formed with open holes (hereinafter, referred to as second open holes 18) allowing the connection holes 15 to be exposed to the outside. The second open holes 18 are provided side by side in a direction oblique to a length direction of the conductive member 10 in correspondence with the connection holes 15.

Figure 5:
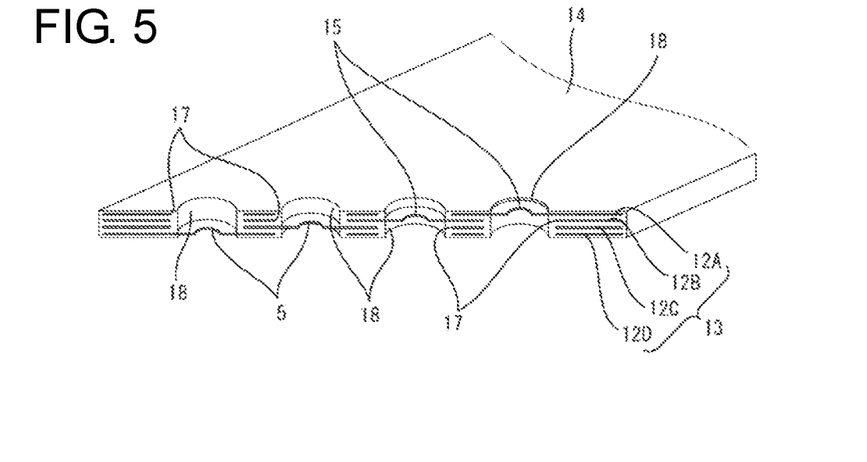
FIG. 5 is a perspective view in section along A-A of FIG. 1 of the conductive member in a state where the insulating portion is formed with second open holes.

All of the second open holes 18 have the same circular shape of the same size, and are disposed coaxially with the through holes 16. A diameter of the second open holes 18 is larger than that of the connection holes 15 and smaller than that of the first open holes 17, as shown in FIG. 5. In this way, the connection holes 15 are exposed via the second open holes 18 and peripheral edges of the first open holes 17 are covered by the insulating portion 14.

Figure 6:
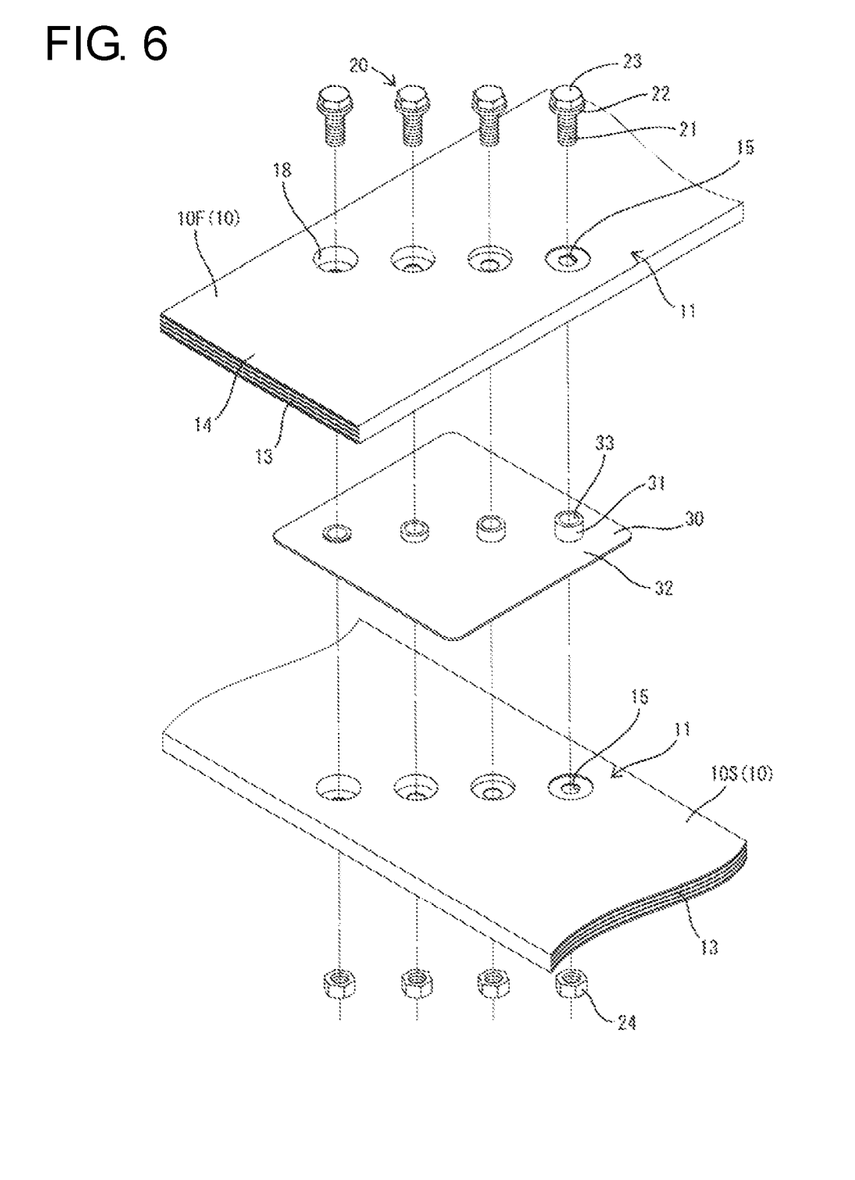
FIG. 6 is an exploded perspective view showing a conductive path.

A conductive path includes the conductive members 10 (only two conductive members 10 are shown in FIG. 6), connecting members 20 for electrically connecting the conductive members 10 and a positioning member 30 for positioning the connecting portions 11 of the conductive members 10.

The connecting member 20 is a fastening member including a bolt and a nut 24 made of metal. A length of a shaft 21 of the connecting member 20 is slightly larger than a thickness of a pair of conductive members 10 to be connected to each other. Hereinafter, one of the pair of conductive members 10 to be connected to each other is referred to as a first conductive member 10F and the other conductive member 10 is referred to as a second conductive member 10S.

A diameter of the connection hole 15 is set such that the shaft 21 of the connecting member 20 is insertable into the connection hole 15, and is smaller than outer diameters of a head 23 and the nut 24 of the connecting member 20. Further, the diameter of the second open hole 18 is slightly larger than an outer diameter of a washer 22 of the connecting member 20.

Figure 7:
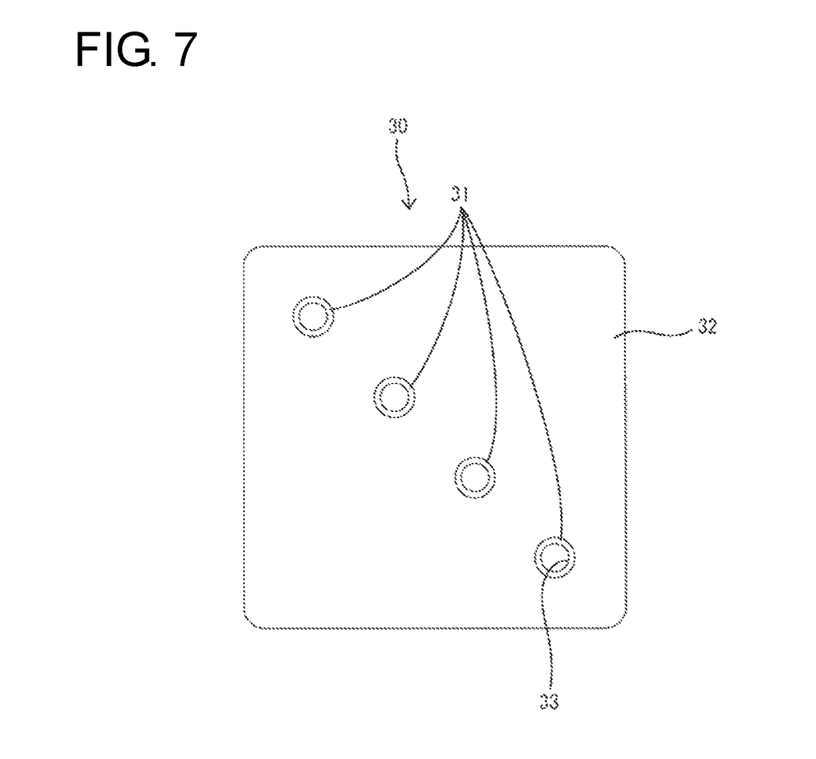
FIG. 7 is a plan view showing a positioning member.
Figure 8:
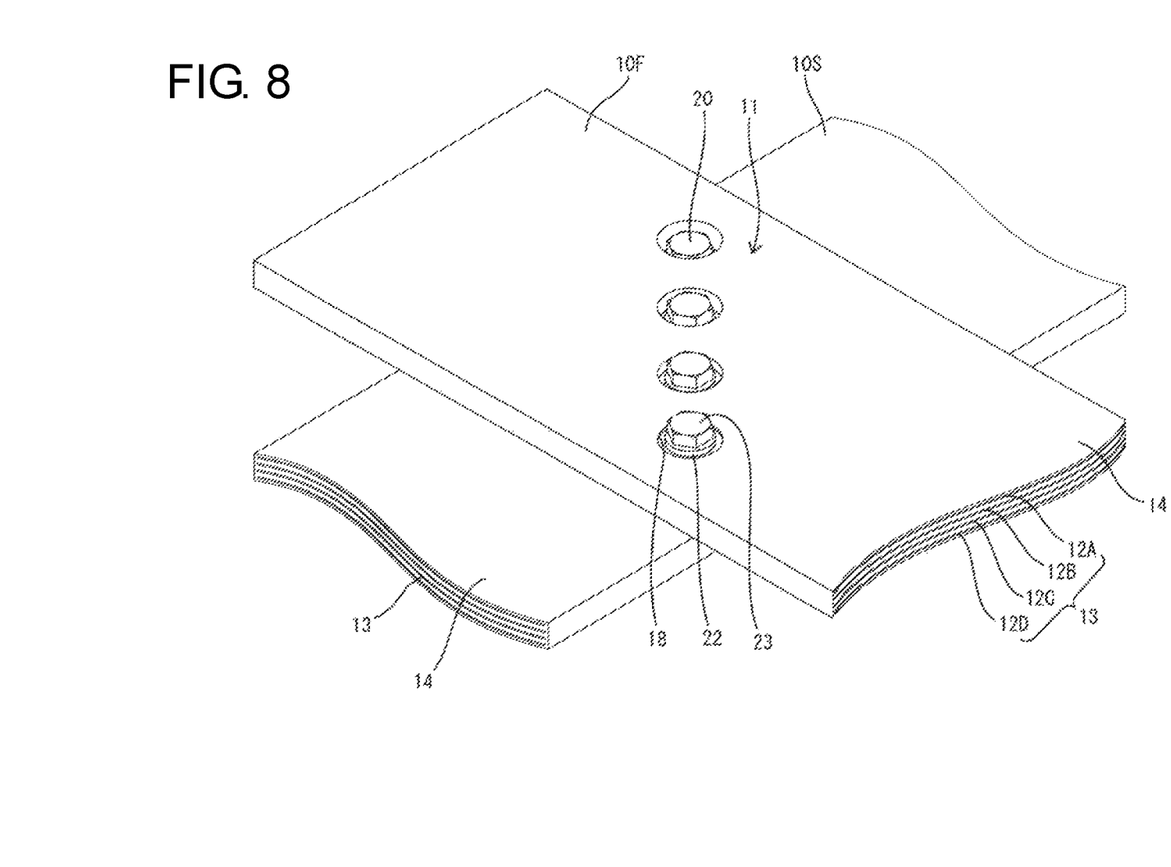
FIG. 8 is a perspective view showing the conductive path in a state where conductive members are connected in orthogonal directions.

The positioning member 30 positions the connecting portions 11 of the first and second conductive members 10F, 10S so that the connection holes 15 of the first conductive member 10F and those of the second conductive member 10S communicate in the plate thickness direction. The positioning member 30 includes tubular portions 31 insertable into the second open holes 18 of the first conductive member 10F and the second open holes 18 of the second conductive member 10S, and a plate 32 to be sandwiched between the first and second conductive members 10F, 10S. The plate 32 is thin and substantially rectangular. The plate 32 is sized not to project in the plate surface direction while being sandwiched between the first and second conductive members 10F, 10S. The tubular portions 31 are held on the plate 32 in such a posture that axes thereof are oriented in a plate thickness direction of the plate 32. The tubular portions 31 project toward both sides in the plate thickness direction of the plate 32. Further, the tubular portions 31 are arranged side by side on a diagonal of the plate 32.

The tubular portions 31 are equal in number of the through holes 16 of the conductive member 10. The tubular portion 31 is a hollow cylindrical member made of metal, a center hole 33 has the same shape as the connection hole 15, and the shaft 21 of the connecting member 20 is insertable into the tubular portion 31. All of the tubular portions 31 have the same shape and are relatively displaced in the plate thickness direction of the plate 32. Heights of both end surfaces of the tubular portions 31 in an axial direction are aligned with those of the connection holes 15 of the first conductive members 10F and those of the connection holes 15 of the second conductive members 10S. In this embodiment, relative heights of the tubular portions 31 from the plate 32 as a reference are lowered gradually from one end toward the other end in an arrangement direction.

Figure 9:
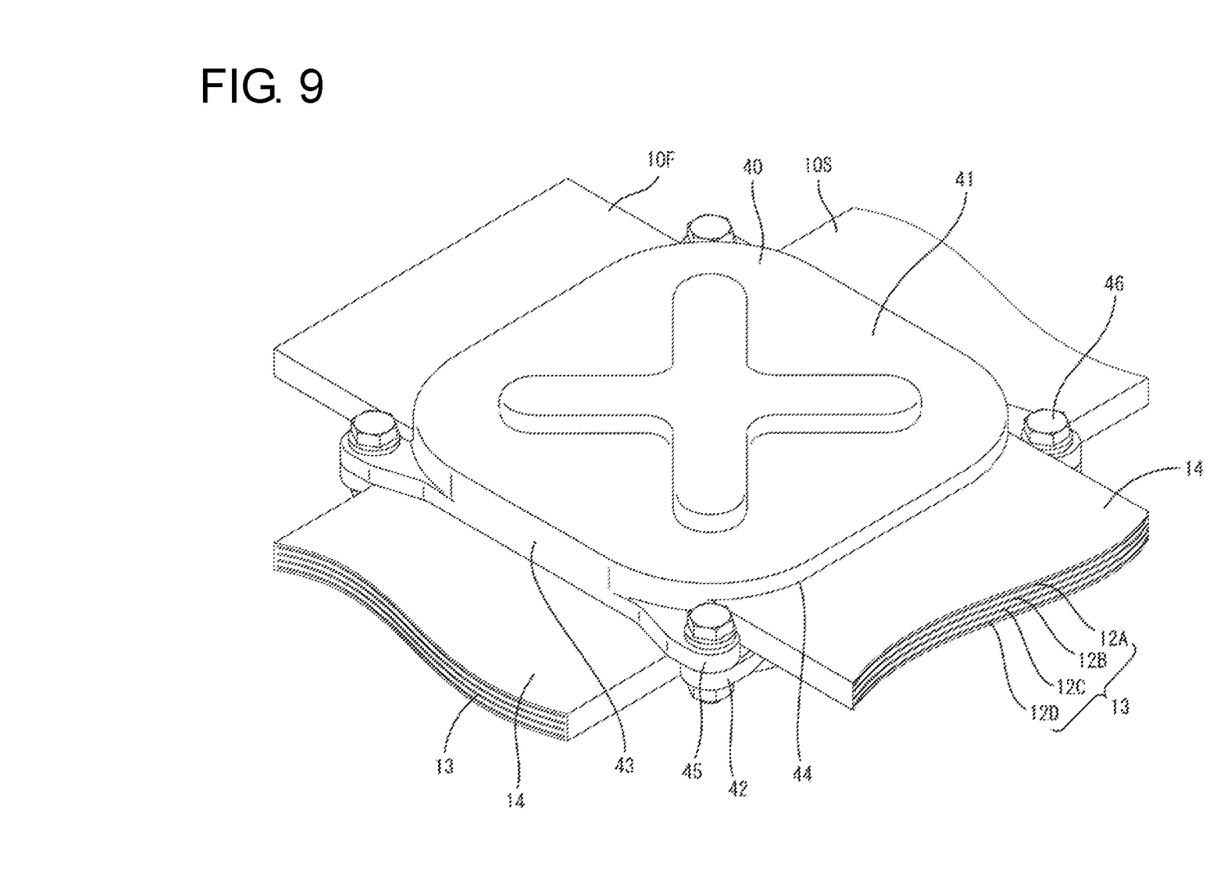
FIG. 9 is a perspective view showing the conductive path in a state where connecting portions of the conductive members are covered by a cover.
Figure 10:
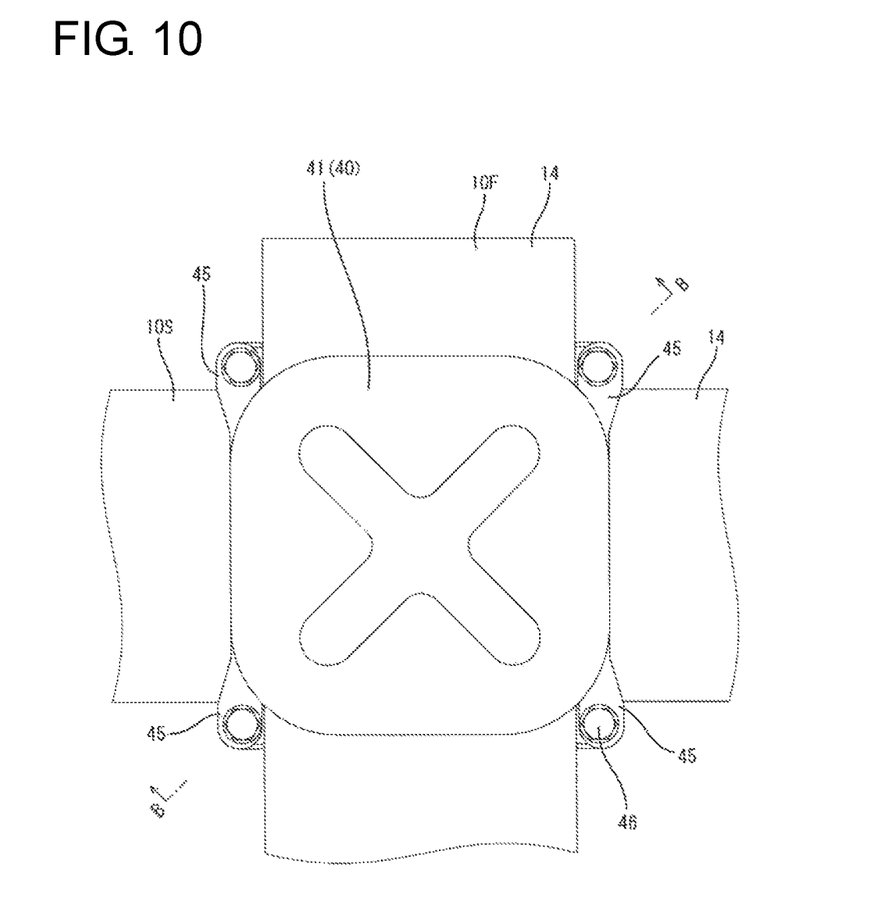
FIG. 10 is a plan view showing the conductive path in the state where the connecting portions of the conductive members are covered by the cover.
Figure 11:
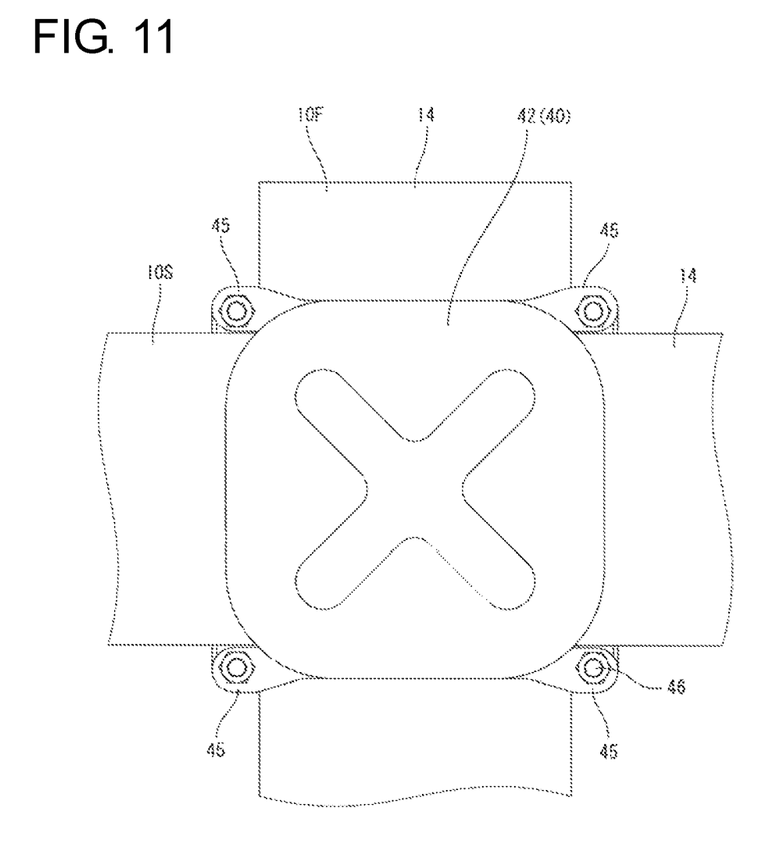
FIG. 11 is a bottom view showing the conductive path in the state where the connecting portions of the conductive members are covered by the cover.
Figure 12:
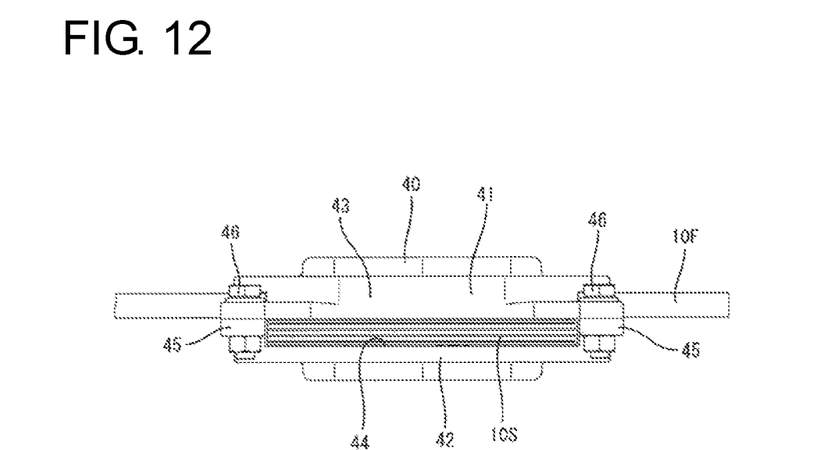
FIG. 12 is a side view when the conductive path in the state where the connecting portions of the conductive members are covered by the cover is viewed from one side.
Figure 13:
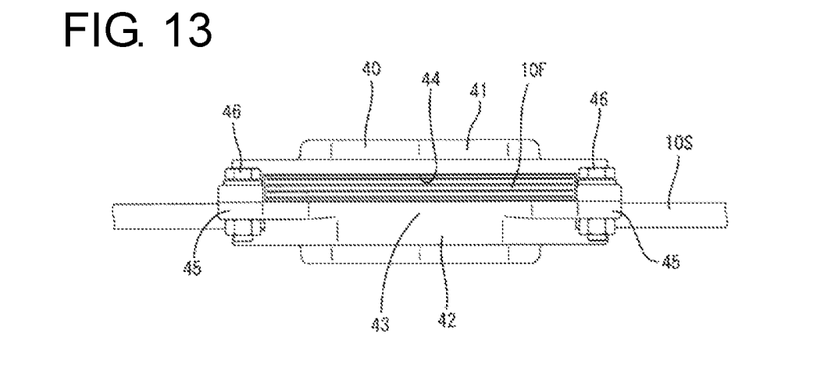
FIG. 13 is a side view when the conductive path in the state where the connecting portions of the conductive members are covered by the cover is viewed from the other side.
Figure 16:
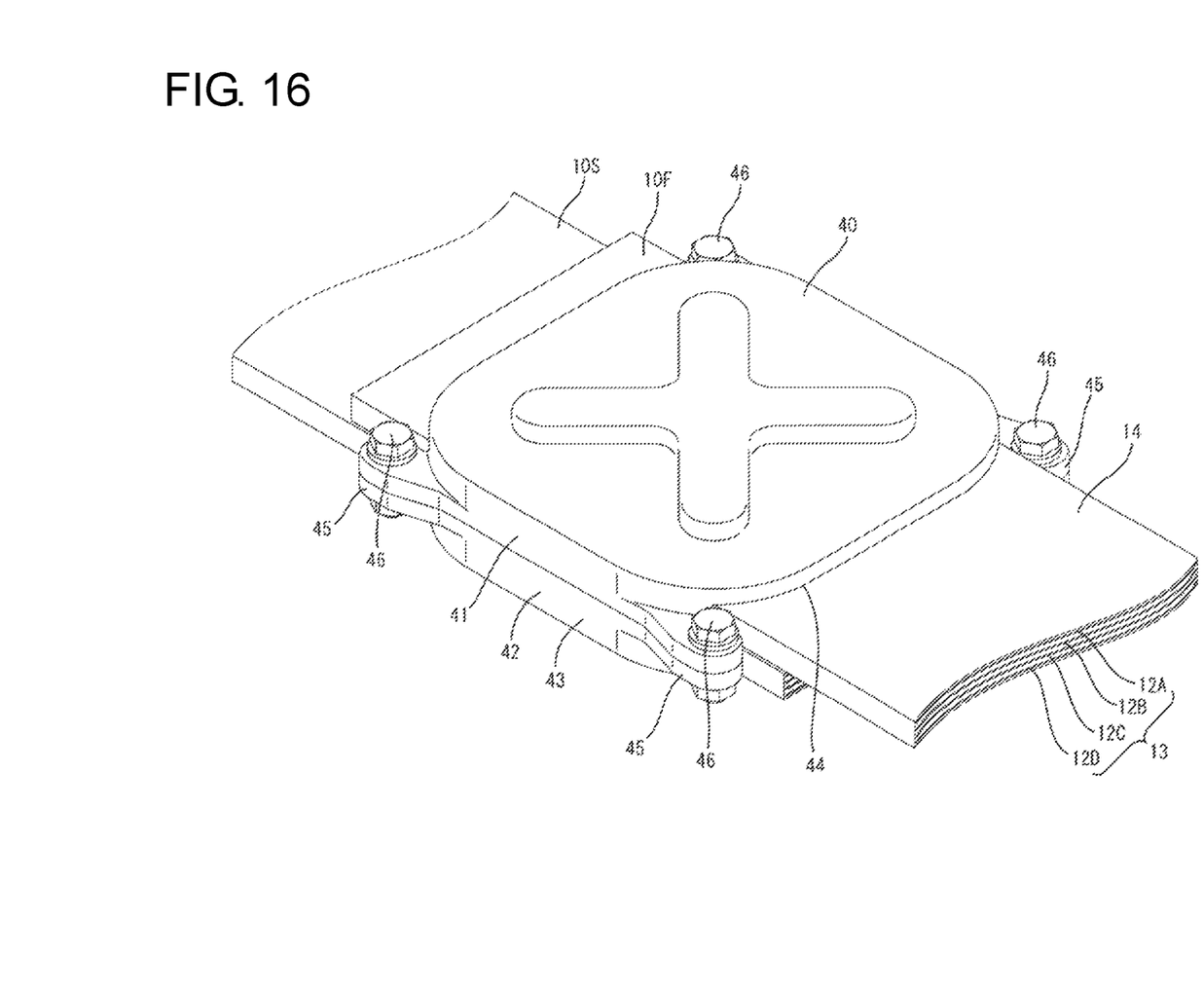
FIG. 16 is a perspective view showing the conductive path in the state where the connecting portions of the conductive members are covered by the cover.

The connecting portions 11 of the first and second conductive members 10F, 10S are covered by a cover 40 (see FIGS. 9 and 16). The cover 40 has an insulating property and covers both upper and lower surfaces of the connecting portions 11. The cover 40 is rectangular in a plan view and collectively covers all the connection holes 15.

The cover 40 is divided into upper and lower parts and includes a first cover portion 41 for covering an upper surface side of the connecting portion 11 and a second cover portion 42 for covering a lower surface side of the connecting portion 11. The first and second cover portions 41, 42 can be united while sandwiching the connecting portions 11 of the first and second conductive members 10F, 10S.

The first and second covers 41, 42 are in the form of flat plates respectively extending along the upper and lower surfaces of the connecting portions 11. Peripheral walls 43 having a height equivalent to a dimension of the conductive member 10 in the plate thickness direction is provided on the outer peripheral edges of the first and second covers 41, 42.

The peripheral walls 43 of the first and second cover portions 41, 42 are provided with pull-out openings 44 through which the conductive members 10 can be pulled out from the cover 40. The pull-out openings 44 are provided in facing parts of the peripheral walls 43. In this embodiment, the first conductive member 10F is pulled out from the pull-out opening 44 of the first cover portion 41, and the second conductive member 10S is pulled out from the pull-out opening 44 of the second cover portion 42.

Fixing portions 45 for fixing the first and second cover portions 41, 42 in a united state are provided on four corners of the cover 40. The fixing portions 45 are fixed by fixing members 46. In this embodiment, the fixing members 46 are fastening members similar to the connecting members 20. The cover member 40 can be used commonly for a connection location where the first and second conductive members 10F, 10S are orthogonal to each other and for a linear connection location.

Next, an exemplary operation of manufacturing the conductive member 10 in this embodiment is described.

Figure 3:
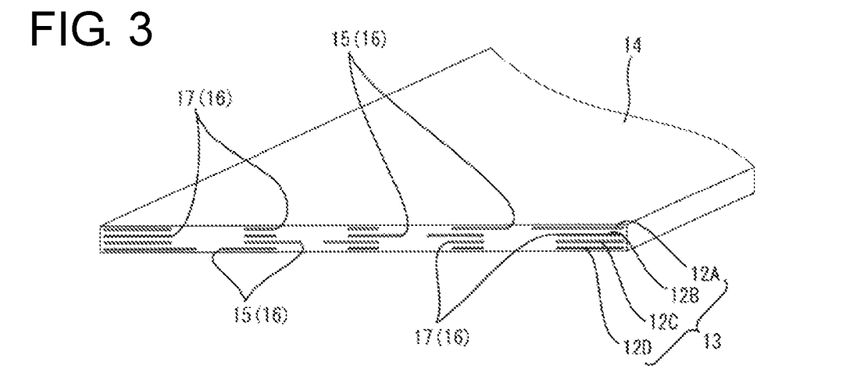
FIG. 3 is a perspective view in section along A-A of FIG. 1 of the conductive portion in a state covered by an insulating portion.

First, the conductive portion 13 is covered with the insulating portion 14. While the plates 12 laminated at predetermined intervals are fed, an insulating material is coated on the plates 12 by extrusion molding. Then, as shown in FIG. 3, the insulating portion 14 is formed with all of the through holes 16 filled with the insulating material.

Figure 4:
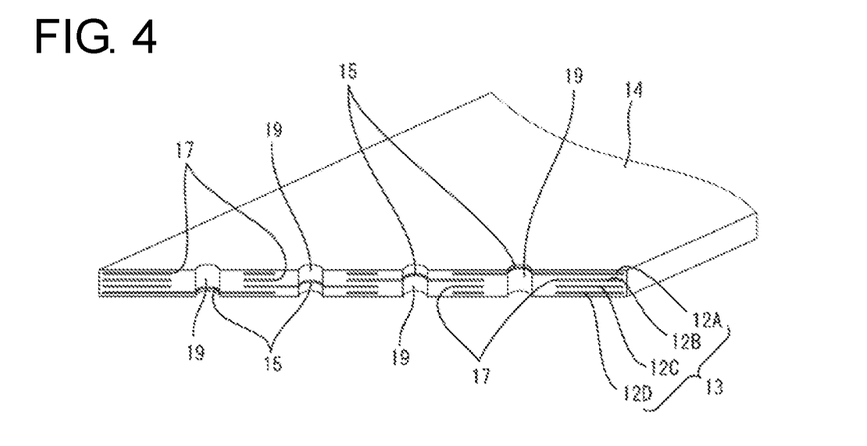
FIG. 4 is a perspective view in section along A-A of FIG. 1 of the conductive member in a state where the insulating portion is formed with removal holes.

Subsequently, the insulating material is removed from the insides of the connection holes 15. As shown in FIG. 4, removal holes 19 having the same shape as the connection holes 15 penetrate entirely through the insulating portion 14 in a thickness direction. In this way, the insulating material is removed from the insides of the connection hole 15.

Subsequently, the insulating portion 14 is formed with the second open holes 18. As shown in FIG. 5, peripheral edges of the connection holes 15 are exposed on an upper surface by removing the insulating material from the upper surface of the insulating portion 14 to the connection holes 15, and the peripheral edges of the connection holes 15 are exposed on a lower surface by removing the insulating material from the lower surface of the insulating portion 14 to the connection holes 15. In this way, the insulating portion 14 is formed with the second open holes 18.

In the above way, the operation of manufacturing the conductive member 10 is completed.

Next, an exemplary operation of connecting the conductive members 10 in this embodiment is described.

First, as shown in FIG. 6, the connecting portion 11 of the first conductive member 10F and the connecting portion 11 of the second conductive member 10S are vertically overlapped and positioned. The positioning member 30 is placed on the upper surface of the connecting portion 11 of the second conductive member 10S. Then, the lower end surfaces of all the tubular portions 31 of the positioning member 30 contact the peripheral edge parts of all the connection holes 15 of the second conductive member 10S. Subsequently, the connecting portion 11 of the first conductive member 10F is overlapped on the upper surface of the positioning member 30. Then, the peripheral edges of all the connection holes 15 of the first conductive member 10F contact the upper end surfaces of all the tubular portions 31 of the positioning member 30. At this time, the first conductive member 10F can be oriented to be orthogonal to the second conductive member 10S (see FIG. 8) or to extend straight (see FIG. 15). In this positioned state, the center holes 33 of the tubular portions 31 coaxially communicate with the connection holes 15 of the first conductive member 10F and the connection holes 15 of the second conductive member 10S. Further, by fitting the tubular portions 31 into the second open holes 18, positional deviations of the first and second conductive members 10F, 10S in the plate surface direction are restricted.

Figure 14:
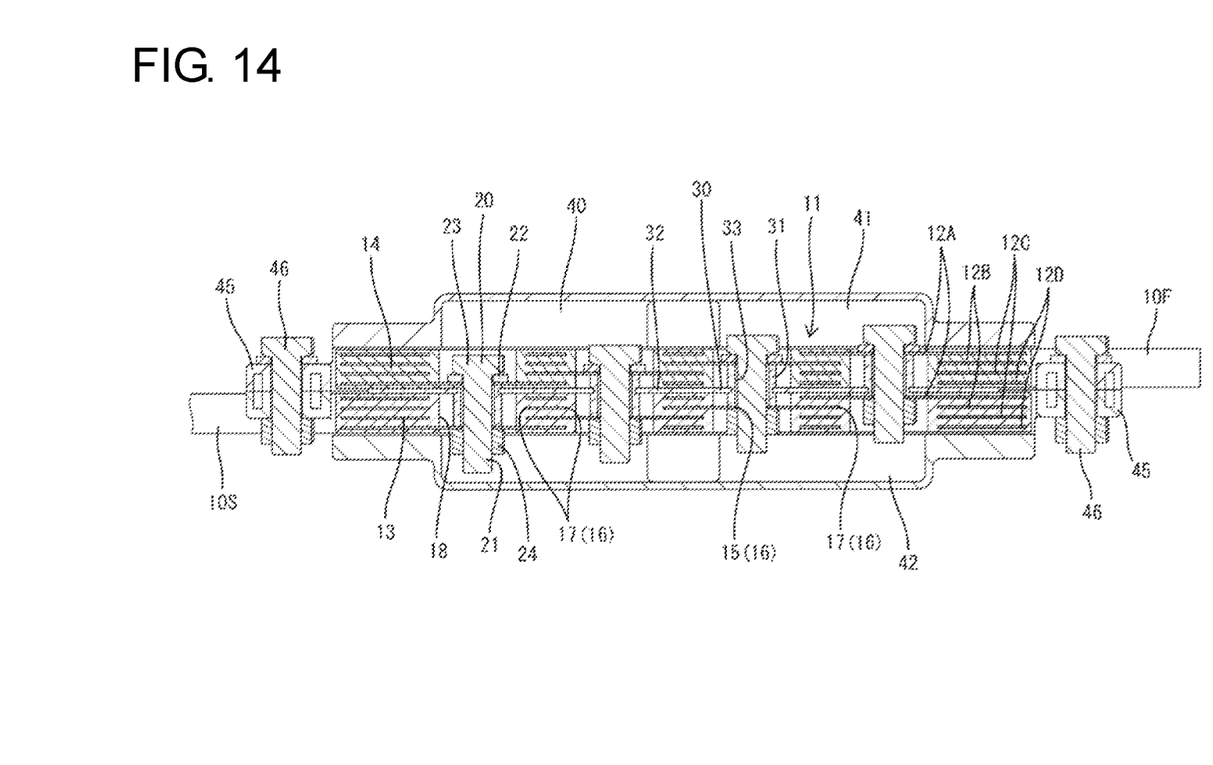
FIG. 14 is a section, corresponding to a cross-section along B-B of FIG. 10, showing the conductive path in the state where the connecting portions of the conductive members are covered by the cover.
Figure 15:
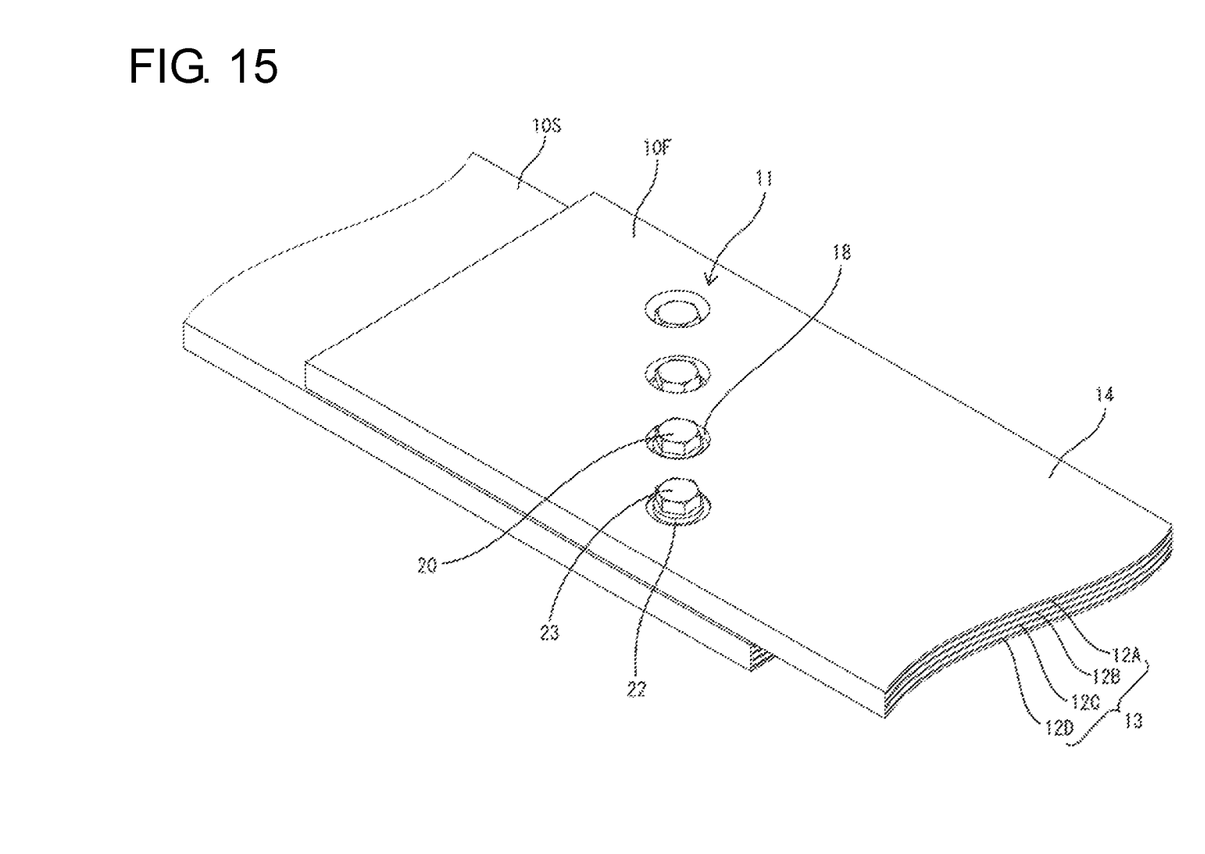
FIG. 15 is a perspective view showing the conductive path in the state where the conductive members are connected in a linear direction.

Subsequently, the connecting portions 11 of the first and second conductive members 10F, 10S are connected by the connecting members 20 (see FIG. 14). The shafts 21 of the connecting members 20 are inserted into the connection holes 15 of the first conductive member 10F from above, and the nuts 24 are tightened onto tips of the shafts 21 projecting down from the connection holes 15 of the second conductive member 10S. The heads 23 of the connecting members 20 are held in close contact with the peripheral edges of the connection holes 15 of the first conductive member 10F via the washers 22, and the nuts 24 are held in close contact with the peripheral edges of the connection holes 15 of the second conductive member 10S. Further, by tightening the connecting members 20, both upper and lower end surfaces of the tubular portions 31 are held in close contact with the peripheral edges of the connection holes 15 of the first conductive member 10F and the peripheral edges of the connection holes 15 of the second conductive member 10S. In other words, the peripheral edges of the respective connection holes 15 are sandwiched by and held in close contact with the end surfaces of the connecting members 20 and the tubular portions 31. In this way, the conductive portion 13 of the first conductive member 10 and that of the second conductive member 10S are connected electrically. In particular, the first plates 12A of the first and second conductive members 10F, 10S, the plates 12B thereof, the third plates 12C thereof and the plates 12D respectively are connected to each other.

Subsequently, the cover 40 is put on the connecting portions 11 of the first and second conductive members 10F, 10S. If the first and second conductive members 10F, 10S are connected in orthogonal directions, the cover 40 is put with the pull-out opening 44 of the first cover portion 41 and that of the second cover portion 42 open in intersecting directions, as shown in FIG. 9. If the first and second conductive members 10F, 10S are connected in a linear direction, the cover 40 is put with the pull-out opening 44 of the first cover portion 41 and that of the second cover portion 42 open in the linear direction (same direction), as shown in FIG. 16. Then, the fixing portions 45 are fixed by the fixing members 46 and the first and second conductive portions 41, 42 are united.

In the above way, the operation of connecting the conductive members 10 is completed.

Next, functions and effects of the embodiment configured as described above are described.

The conductive member 10 of this embodiment includes the conductive portion 13 in which the conductive plates 12 are arranged at intervals in the plate thickness direction and the insulating portion 14 for covering the conductive portion 13 and insulating between the plates 12, each of the plates 12 is formed with the penetrating connection hole 15 enabling electrical connection of each plate 12 to the outside, and the connection holes 15 are at the positions displaced in the plate surface direction in the plates 12 and exposed to outside via the first open holes 17 and the second open holes 18 provided in the plates 12 and the insulating portion 14. According to this configuration, since conductive paths are formed by the plates 12, empty spaces formed around can be made smaller than before when the conductive paths extend along a mounting surface. Thus, space saving can be realized. Note that the flat plates 12 are effective also as a measure for preventing noise of the power supply circuits.

Further, the connection holes 15, the first open holes 17 and the second open holes 18 are arranged side by side in the direction oblique to the length direction of the plates 12. According to this configuration, the conductive members 10 can be connected in the linear direction or in the orthogonal directions.

Further, the positioning member 30 can position the first and second conductive members 10F, 10S such that the connection holes 15 of the first conductive member 10F and those of the second conductive member 10S communicate in the plate thickness direction. According to this configuration, a connecting operation of the conductive members 10 can be performed easily.

The invention is not limited to the above described and illustrated embodiment. For example, the following embodiments also are included in the scope of the invention.

Although the positioning member 30 includes as many tubular portions 31 as the through holes 16 in the above embodiment, there may be fewer tubular portions than through holes.

Although the heights of the connection holes 15 are successively displaced from one end toward the other end of the conductive member 10 in the above embodiment, the heights of the connection holes may not necessarily be displaced.

Although the through holes 16 are circular in the above embodiment, the through holes may be rectangular, elliptical or other shape.

The connecting member 20 is the fastening member including the bolt and the nut 24 in the above embodiment. However, the connecting member may be a rivet, a wedge member or the like.

Two conductive members 10 are connected in the above embodiment, but there may be only one conductive member or three or more conductive members 10.

The connection holes 15 are arranged oblique to the length direction of the conductive portion 13 in the above embodiment, but the connection holes may be arranged linearly or elliptically, for example.

The conductive members 10 have substantially the same shape in the above embodiment, but conductive members having different shapes (lengths and widths) may be connected.

Although two conductive members 10 are connected at one location in the above embodiment, three or more conductive members may be connected at one location.

Although one conductive portion 13 includes four plates 12 in the above embodiment, there is no limitation to this and the number of the plates can be arbitrarily changed.

LIST OF REFERENCE SIGNS

12 . . . plate
13 . . . conductive portion
14 . . . insulating portion
15 . . . connection hole
17 . . . first open hole
18 . . . second open hole
20 . . . connecting member
30 . . . positioning member

The invention claimed is:

1. A conductive path, comprising:
a plurality of conductive members, each of the plurality of conductive members having a plurality of conductive plates spaced from one another in a direction perpendicular to a thickness direction of the conductive plates, spaced-apart holes penetrating through each of the conductive plates to define an array of holes in each of the conductive plates, the array of holes in each of the conductive plates are coaxially aligned to each other, the holes in each of the arrays defining a connection hole, and a plurality open holes, the open holes are larger than the connection hole; and
an insulating portion covering the conductive portion and insulating between the plates; wherein
the open holes of one of the conductive plates expose the connection hole of an adjacent conductive plate of the conductive plates;
wherein a positioning member in between the first and second conductive members, the positioning member having a positioning plate with plurality of tubular portions projecting therefrom, the tubular portions passing through the open holes.

2. The conductive path of claim 1, further comprising:
a plurality of connecting members inserted into the connection holes to electrically connecting the conductive plates to each other.

3. The conductive path of claim 2, wherein the arrays of holes are arranged side by side in a direction oblique to a length direction of the conductive plates.

4. The conductive path of claim 3, wherein the tubular portions of the positioning member are formed from a conductive material and are configured for positioning the plurality of conductive members such that the connection holes communicate in the thickness direction.

5. The conductive member of claim 1, wherein the tubular portions of the positioning member are formed from a conductive material and are spaced radially inward from all of the conductive plates that have the open holes.

6. The conductive member of claim 5, wherein the tubular portions of the positioning member have lengths so that an end of each of the tubular portions contacts a corresponding one of the conductive plates at a position radially outward of the connection hole.

7. The conductive member of claim 1, wherein lengths of the tubular portions correspond to distances between an outer surface of the insulating portion adjacent the respective array of axially aligned holes and a surface of the conductive plate that has the connection hole in the respective array of holes.

8. The conductive member of claim 7, wherein the lengths of the tubular portions are different from one another.

* * * * *